(12) United States Patent
Robertson

(10) Patent No.: US 6,307,472 B1
(45) Date of Patent: Oct. 23, 2001

(54) POST OFFICE BOX SYSTEM AND APPARATUS FOR INDICATING POST OFFICE BOX OCCUPANCY

(76) Inventor: Darryl Lee Robertson, 20836 N. 21st Ave., Phoenix, AZ (US) 85027

(*) Notice: Subject to any disclaimer, the term of this patent is extended or adjusted under 35 U.S.C. 154(b) by 0 days.

(21) Appl. No.: 09/422,455

(22) Filed: Oct. 21, 1999

(51) Int. Cl.[7] .................................................. G08B 13/14
(52) U.S. Cl. ........................ 340/569; 340/531; 340/525; 340/825.28
(58) Field of Search ............................. 340/525, 825.28, 340/286.09, 286.08, 286.07, 531, 569; 705/445, 15

(56) References Cited

U.S. PATENT DOCUMENTS

| | | | |
|---|---|---|---|
| 943,940 | * 12/1909 | Kenny | 340/525 |
| 3,675,204 | * 7/1972 | Miehle et al. | 340/525 |
| 3,750,103 | * 7/1973 | Angus et al. | 340/825.28 |
| 4,101,877 | * 7/1978 | Rush | 340/569 |
| 4,163,225 | * 7/1979 | Engel | 340/569 |
| 4,222,111 | * 9/1980 | Sloan et al. | 340/286.09 |
| 4,287,514 | * 9/1981 | Wartman et al. | 340/569 |
| 4,314,102 | * 2/1982 | Lowe et al. | 379/106.11 |
| 4,520,350 | 5/1985 | Huang | 340/569 |
| 4,530,067 | * 7/1985 | Dorr | 705/15 |
| 4,777,488 | * 10/1988 | Carlman, Jr. et al. | 340/825.72 |
| 4,794,377 | * 12/1988 | Benages | 340/569 |
| 4,849,733 | 7/1989 | Conigliaro et al. | 340/457.1 |
| 4,868,543 | * 9/1989 | Binkley | 340/569 |
| 4,872,210 | * 10/1989 | Benages | 340/569 |
| 5,023,595 | * 6/1991 | Bennett | 340/569 |
| 5,060,854 | 10/1991 | Armstrong | 232/37 |
| 5,239,305 | * 8/1993 | Murphy et al. | 340/539 |
| 5,272,474 | * 12/1993 | Hilliard | 340/825.08 |
| 5,483,221 | 1/1996 | Mutter et al. | 340/457.1 |
| 5,555,458 | * 9/1996 | Large | 340/945 |
| 5,612,876 | 3/1997 | Zeidler et al. | 701/45 |
| 5,664,728 | 9/1997 | Jones | 232/36 |
| 5,752,299 | 5/1998 | Vivacqua et al. | 24/633 |
| 5,818,336 | * 10/1998 | Varga et al. | 340/545 |
| 5,920,057 | * 7/1999 | Sonderegger et al. | 235/384 |
| 6,114,959 | * 9/2000 | Bennett | 340/569 |

* cited by examiner

Primary Examiner—Benjamin C. Lee
(74) Attorney, Agent, or Firm—Parsons & Goltry; Michael W. Goltry; Robert A. Parsons

(57) ABSTRACT

A networked architecture for indicating node usage or occupancy comprising a plurality of nodes each movable between an unoccupied condition and an occupied condition, a plurality of sensor devices each movable from an inactive condition to an active condition in response to movement of one of the nodes from the unoccupied condition to the occupied condition, and indicator apparatus defining a plurality of indicator elements each for emitting a stimulus in response to movement of one of the sensor devices from the inactive condition to the active condition.

6 Claims, 1 Drawing Sheet

POST OFFICE BOX SYSTEM AND APPARATUS FOR INDICATING POST OFFICE BOX OCCUPANCY

FIELD OF THE INVENTION

This invention relates to networked architectures and, more particularly, to systems and methods for indicating location usage or occupancy.

BACKGROUND OF THE INVENTION

In many situations there is a need to know whether an object is in a certain location, or whether a certain location is being used or occupied. For instance, it would be very useful to know whether a Post Office Box contains mail, whether a parking spot is occupied by a vehicle, whether a seat of a multi-passenger vehicle is occupied by a passenger, whether a seat is occupied by a patron at a theater such as a movie house, play house, symphony house or stadium. To know this information would allow people to know when mail is in their Post Office Box, and, in regards to a theater or a multi-passenger vehicle, to know not only how many seats are occupied, but also how many seats are unoccupied and the locations of the occupied and unoccupied seats. In response to having this information, people would then, for instance, know when to pick up their mail, and be able to not only direct patrons or customers to unoccupied seats but also ensure seats are properly occupied. Given the lack of devices or systems for accommodating these goals, the need for certain new and useful improvements in the art is evident.

Accordingly, it would be highly desirable to provide a new and improved system and method for indicating location usage or occupancy.

It is a purpose of the invention to provide new and improved apparatus having nodes defining seats, slots, Post Office Boxes, or parking spaces, and a system for indicating node usage or occupancy.

It is another purpose of the invention to provide a new and improved system for indicating location usage or occupancy that is easy to construct.

It is still another purpose of the invention to provide a new and improved system for indicating location usage or occupancy that is easy to use.

It is a further provision of the invention to provide a new and improved system for indicating location usage or occupancy that is easy to implement in multi-passenger vehicles, parking lots, theaters, video and book stores, post offices, etc.

SUMMARY OF THE INVENTION

The above problems and others are at least partially solved and the above purposes and others realized in new and improved apparatus comprising a plurality of nodes each movable between an unoccupied condition and an occupied condition, a plurality of sensor devices each movable from an inactive condition to an active condition in response to movement of one of the nodes from the unoccupied condition to the occupied condition, and indicator apparatus defining a plurality of indicator elements each for emitting a stimulus in response to movement of one of the sensor devices from the inactive condition to the active condition. The indicator apparatus is fixed, mounted or positioned at a location either remote from or adjacent to the nodes, and each sensor device is coupled in signal communication to the indicator apparatus over a communication pathway. The indicator apparatus may further comprise a panel or framework housing a plurality of indicator elements, or may comprise a plurality of individual units such as pagers, monitors, computers, telephones or individual subscriber units such as wireless ground- or satellite-based telecommunication devices. The stimulus may comprise an audible stimulus and/or a visual stimulus.

BRIEF DESCRIPTION OF THE DRAWINGS

The foregoing and further and more specific objects and advantages of the invention will become readily apparent to those skilled in the art from the following detailed description taken in conjunction with the drawings in which.

DETAILED DESCRIPTION OF A PREFERRED EMBODIMENT

Figure 1:
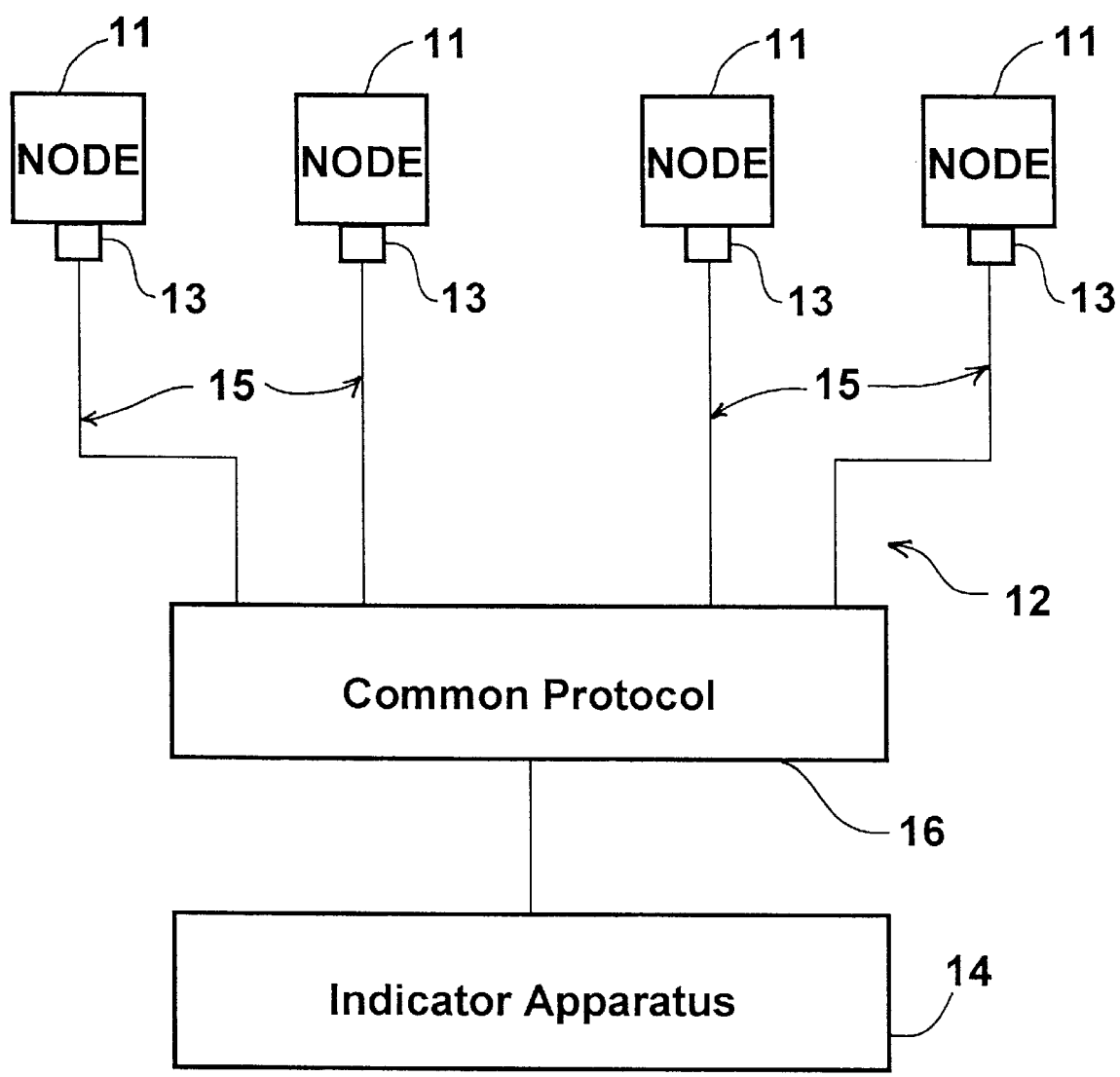
FIG. 1 is a schematic representation of apparatus comprising a plurality of nodes or locations and a system for indicating node or location usage or occupancy.

The present invention proposes an architecture for acquiring or generating information, namely, indicating the presence or absence of physical objects at locations such as seats, parking spaces and Post Office Boxes. Turning to the drawing, in which like reference characters indicate corresponding elements, FIG. 1 illustrates a schematic representation of apparatus 10 comprising a plurality of nodes or locations 11 and a system 12 for indicating node or location 11 usage or occupancy. The nodes 11 may comprise Post Office Boxes for accommodating mail, vehicle parking spots in a parking lot or structure, slots for accommodating videos at a video store, seats for accommodating human occupants whether in a theater such as a stadium, movie house, play house, symphony house, seats in a multi-passenger vehicle such as a car, bus, airplane, train, etc. When unoccupied, each node 11 defines an unoccupied condition. When occupied by an object, each node 11 defines an occupied condition. System 12 may be energized with a discrete power source such as a generator or battery, or a dedicated power source, and comprises a plurality sensor devices 13, indicator apparatus 14 and a communication pathway 15 coupling the sensor devices 13 to indicator apparatus 14 in signal communication.

When a node 11 is occupied or is becoming occupied by an object, the object will exert a physical stimulus capable of being detected by the sensor device 13 of the node 11. This physical stimulus could be pressure exerted against the node by the weight of the object, heat emitted from the object occupying the node, motion of the object as it occupies the node 11 or during the time at which the object is being introduced upon the node 11, etc. In this regard, each sensor device 13 may comprise a conventional pressure sensor, and/or a conventional heat sensor and/or a conventional motion sensor, or other sensor device for detecting a physical stimulus from an object as it occupies a node 11, or during the time at which the object is being introduced upon the node 11. Other devices that may be marshaled among the foregoing include, for instance, optical, magnetic, capacitive, electromagnetic or radio frequency, ferrous, acoustic, resistive, scent-based, tactile, mechanical position, velocity, acceleration, yaw, pitch, roll, visual, infrared, flow, moisture, mass, force and chemical sensor devices. Each sensor device 13 is operative, therefore, for detecting its respective node 11 occupancy, and is movable between an inactive or resting condition and an active condition in response to movement of its respective node 11 between the unoccupied and occupied conditions.

Indicator apparatus 14 is fixed, mounted or positioned at a location either remote from or adjacent to nodes 11, and each sensor device 13 is coupled in signal communication to indicator apparatus 14 over communication pathway 15. Indicator apparatus 14 is carried, housed, fixed or mounted at a location either remote from or adjacent to nodes 11, and, in response to movement of sensor devices 13 between their inactive and active conditions, emits a stimulus corresponding to node 11 occupancy. Indicator apparatus 14 may comprise a panel, structure or framework defining or housing a plurality of indicator elements each designed to emit the stimulus to indicate the usage or occupancy of a given node 11. This would allow a single observer know the status of all of the nodes 11 at one time. In other embodiments, indicator apparatus 14 may comprise one or more individual units such as pagers, monitors, computers, telephones or individual subscriber units such as wireless ground- or satellite-based telecommunication devices or other similar apparatus each having one or more indicator elements designed to emit the stimulus to indicate the usage or occupancy of a given node 11. The stimulus may comprise a visual stimulus and/or an audible. The elements may each comprise a light fixture, a video display device or other type of device operative for emitting a visual stimulus, or a speaker or other device operative for emitting an audible stimulus.

The communication pathway 15 between nodes 11 and indicator apparatus 14 may comprise a single communication link or multiple communication links, may be hard wired or wireless, and may comprise a radio-frequency or telecommunication pathway, whether ground- or satellite-based or an Internet-based communication pathway. When a sensor device 13 is moved into the active condition indicating occupancy of its respective node 11, sensor device 13 sends a signal to indicator apparatus 14 over communication pathway 15. In response to receiving this signal, indicator apparatus 14 emits the stimulus to indicate the usage or occupancy of that specific node 11. Communication pathway 15 may include a common protocol 16 between nodes 11 and indicator apparatus 14. Protocol 16 may define processing, communication, computing, logic circuitry and/or controller apparatus 16 for providing communication between nodes 11 and indicator apparatus 14. Protocol 16 may be run by software. The signal sent by each sensor device 13 is addressed to a particular element of indicator apparatus 14 or to a particular element of a single indicator apparatus 14. Protocol 16 may comprise the means of controlling this feature of the invention. Furthermore, should indicator apparatus 14 comprise a computer, a pager or an individual subscriber unit such as a ground- or satellite based telephone or a conventional telephone, the user may dial into protocol 16 of system 12 to access data regarding node 11 usage or occupancy.

The invention has been described above with reference to one or more preferred embodiments. However, those skilled in the art will recognize that changes and modifications may be made in the described embodiments without departing from the nature and scope of the invention. Various changes and modifications to one or more of the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

What is claimed is:

1. Apparatus comprising:

post office boxes associated with a network of sensor devices ant each movable between an unoccupied condition and an occupied condition containing mail;

remote indicator elements communicating with the sensor devices over a global-computer network;

the sensor devices each movable between inactive and active conditions in response to movement of one of the post office boxes from the unoccupied condition to the occupied condition; and the indicator elements each for issuing a stimulus in response to movement of one of the sensor devices from the inactive condition to the active condition.

2. Apparatus of claim 1, wherein the stimulus comprises at least one of an audible stimulus and a visual stimulus.

3. Apparatus comprising:

a post office box associated with a sensor device communicating with a remote indicator element over a global computer network, the post office box movable between an unoccupied condition and an occupied condition containing mail;

the sensor device associated with the post office box and movable between inactive and active conditions in response to movement of the post office box from the unoccupied condition to the occupied condition; and the remote indicator element for issuing a stimulus in response to movement of the sensor device from the inactive condition to the active condition.

4. Apparatus of claim 3, wherein the stimulus comprises at least one of an audible stimulus and a visual stimulus.

5. In a plurality of post office boxes each movable between an unoccupied condition and an occupied condition containing mail, apparatus comprising:

sensor devices and remote indicator elements communicating over a global computer network and associated with the post office boxes;

the sensor devices each movable between inactive and active conditions in response to movement of one of the post office boxes from the unoccupied condition to the occupied condition; and the indicator elements each for issuing a stimulus in response to movement of one of the sensor devices front the inactive condition to the active condition.

6. Apparatus of claim 5, wherein the stimulus comprises at least one of an audible stimulus and a visual stimulus.

* * * * *

UNITED STATES PATENT AND TRADEMARK OFFICE
CERTIFICATE OF CORRECTION

PATENT NO. : 6,307,472 B1
DATED : October 23, 2001
INVENTOR(S) : Darryl Lee Robertson It is certified that error appears in the above-identified patent and that said Letters Patent is hereby corrected as shown below:

Column 4,
Line 12, replace "ant" with -- and --.

Signed and Sealed this

Seventeenth Day of September, 2002

Attest:

JAMES E. ROGAN
Attesting Officer
Director of the United States Patent and Trademark Office